Patented Nov. 27, 1945

2,389,896

UNITED STATES PATENT OFFICE 2,389,896

MODIFIED ALKYD RESIN VARNISHES

Gaetano F. D'Alelio and James W. Underwood, Pittsfield, Mass., assignors to General Electric Company, a corporation of New York No Drawing. Application July 14, 1942,
Serial No. 450,917

6 Claims. (Cl. 260—42)

This invention relates to alkyd resin coating compositions. It is particularly concerned with ordinary oil modified-polycarboxylic acid-polyhydric alcohol resin varnishes which have been further modified by the addition of 1-substituted guanazole-aldehyde resins to produce coating compositions that can be quickly baked to a hard, tack-free, flexible, and abrasion-resistant state.

The guanazole resins used in the practice of our invention are the resinous reaction products of an aldehyde, preferably formaldehyde, and a 1-substituted guanazole represented by the formula

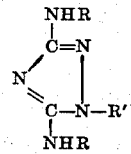

where R is a member of the class consisting of hydrogen and monovalent hydrocarbon radicals, e. g., methyl, ethyl, butyl, isobutyl, neopentyl, allyl, butenyl, phenyl, naphthyl, benzyl, phenethyl tolyl, xylyl, cyclopentyl, cyclohexyl, etc. or any substitution product of the aforementioned radicals, e. g., chlor-propyl, bromphenyl, hydroxybutyl, hydroxynaphthyl, bromobutenyl, nitrobenzyl, cresyl, etc. and R' is a member of the class consisting of alkyl radicals, e. g., methyl, ethyl, propyl, isobutyl, etc. radicals; aryl radicals, e. g., phenyl and substituted phenyl radicals of the formula

wherein R has the meaning indicated above and $n$ is an integer from 1 to 5, naphthyl radicals, etc. The preferred modifiers are those resins prepared from the designated guanazole derivatives in which R' is an aryl group, preferably a substituted phenyl group, such as a tolyl group, or a naphthyl group. As will be shown more fully hereinafter, resins from guanazole derivatives such as 1-tolyl guanazole or 1-naphthyl guanazole, can be condensed or resinified to a greater extent without losing the property of being soluble in common alkyd resin solvents, than can the resins made from other guanazole derivatives.

The above-mentioned guanazole resins have been found to offer a number of advantages as modifiers for alkyd resin varnishes. For example, whereas many resins, such as the urea-formaldehyde resins, now used to modify alkyds must first be reacted with alcohols in order that they may be dissolved in ordinary alkyd resin solvents, the guanazole resins used in the practice of this invention are soluble in such varnish solvents without modification. Because of the general solubility of the 1-substituted guanazole-formaldehyde resins particularly the 1-aryl guanazole-aldehyde resins, the resins may be used as modifiers for a wide variety of alkyd resin varnishes to produce clear coating compositions that can be cured quickly to a water-resistant, tack-free, hard, mar-proof, transparent state.

In order that those skilled in the art better may understand how the present invention can be carried into effect the following illustrative examples are given:

Example 1

A 1-m-tolyl guanazole resin was prepared by heating a mixture of

| | Parts by weight |
|---|---|
| 1-m-tolyl guanazole | 283 |
| Aqueous formaldehyde (37.1% CH₂O) | 363 |
| Sodium hydroxide solution (0.46N) | 15 | at approximately 60–80° C. until the resulting resin layer was solid at room temperature. A solution of the resinous condensation product was made by dissolving one part resin in 2 parts by weight of butyl alcohol.

Three parts of this solution were added to 2 parts of a coconut oil-modified alkyd resin varnish consisting of a 50 per cent toluene solution of the reaction product of 28 parts by weight glycerine, 42 parts phthalic anhydride, 15 parts coconut oil acids, and 15 parts coconut oil. Films of the resultant varnish when baked at 100° C. for 3 hours were transparent, water-resistant, smooth, glossy, and more mar-resistant than films of the original coconut oil-alkyd varnish. Comparable results were obtained with a castor oil-alkyd resin varnish, consisting of a 65 per cent xylol solution of the resinous reaction product of about 14 parts glycerine, 36 parts phthalic anhydride, 5 parts ethylene glycol, and 45 parts castor oil.

Similar improvements were obtained using resins prepared from equal weights of 1-p- or 1-o-tolyl guanazole in place of the 1-m-tolyl guanazole as modifiers.

A further improvement in the mar- or scratch-resistance and hardness of the baked films of the modified varnish can be obtained by adding a small amount of a curing agent, such as chloroacetamide, to the guanazole resin during the preparation thereof or at any time prior to its incorporation into the alkyd varnish. Curing agents other than chloroacetamide which can be incorporated into the guanazole reaction mixture either at the beginning, during, or after, the resin forming reaction include alpha beta dibromopropionitrile, sulfamic acid, polysalicylide, aminoacetamide hydrochloride, chloroacetyl urea, nitrourea, glycine, etc. The term "curing agent" as used herein and in the appended claims is intended to cover any of these compounds which accelerate the hardening or curing of the guanazole resin, whether the agent does or does not in itself resinify or enter into the resin-forming reaction. Further examples of curing agents which may be used are to be found in applications S. N. 289,435, filed August 10, 1939, S. N. 346,962, filed July 23, 1940 and S. N. 354,395, filed August 27, 1940 in the name of Gaetano F. D'Alelio, and in D'Alelio and Underwood application S. N. 409,325, filed August 30, 1941, all of which applications are assigned to the same assignee as the present invention.

*Example 2*

A guanazole resin in which a curing agent was added at the beginning of the reaction was made by heating a mixture of

| | Parts by weight |
|---|---|
| 1-o-tolyl guanazole | 283 |
| Aqueous formaldehyde (37.1% CH$_2$O) | 363 |
| Sodium hydroxide solution (0.46N) | 15 |
| Chloroacetamide | 2 | at 60–80° C. until the resin layer was solid at room temperature. The resin was dissolved in butyl alcohol in the ratio of 1 part resin to 2 parts alcohol. The coconut oil and castor oil-alkyd resin varnishes of Example 1 were modified with the resulting guanazole resin solution by adding 3 parts thereof to 2 parts by weight of each of the alkyd varnishes. Films of the modified resins, baked at 100° C. for 3 hours, were transparent, smooth, adhering, water-white, tack-free, water-resistant, and harder and more scratch-resistant than were the baked films of Example 1 due to the presence of the curing agent in the quanazole resin.

*Example 3*

A naphthyl guanazole resin was prepared by heat-reacting a mixture of

| | Parts by weight |
|---|---|
| 1-alpha-naphthyl guanazole | 56 |
| Aqueous formaldehyde (37.1% CH$_2$O) | 61 |
| Sodium hydroxide (0.46N) | 2.5 |
| Chloroacetamide | 1.0 |

The resin was dissolved in butyl alcohol in the proportion of 1 part resin to 2 parts alcohol and the alkyd varnishes of Example 1 were modified by the addition of this resin solution in the same proportions as in the previous examples. Baked films of the resultant varnishes were comparable with those of Example 2. Similar results were obtained using a modifying resin prepared from an equivalent proportion of 1-beta-naphthyl guanazole, instead of the 1-alpha-naphthyl guanazole.

*Example 4*

A 1-phenyl guanazole resin was prepared by heating a mixture of

| | Parts by weight |
|---|---|
| 1-phenyl guanazole | 65 |
| Aqueous formaldehyde | 91 |
| Sodium hydroxide solution (0.46N) | 4 |
| Polysalicylide | 1 | on a steam plate until the resinous layer solidified on cooling to room temperature. The resin was dissolved in 2 parts by weight of butyl alcohol and mixed with the alkyd resin varnishes of Example 1 in the ratio of 3 parts guanazole resin solution to 2 parts alkyd resin varnish. Baked films of these modified alkyds were comparable to those obtained in any of the previous examples wherein a curing agent was added to the guanazole resin. When no curing agent was used the baked films were not so scratch-resistant, but were nevertheless much superior in this respect to films of the unmodified alkyd resins. Curing agents other than polysalicylic acid that have been used in preparing guanazole resins of the above formulation are aminoacetamide hydrochloride, chloroacetylurea, glycine, and chloroacetamide.

*Example 5*

A 1-phenyl guanazole resin was prepared by heating a mixture of

| | Parts by weight |
|---|---|
| 1-phenyl guanazole | 175 |
| Aqueous formaldehyde (37.1% CH$_2$O) | 162 |
| Sodium hydroxide solution (0.5N) | 4 |
| Aqueous ammonia (28% NH$_3$) | 6 |
| Chloroacetamide | 2.4 | at 60–80% C. When two layers formed, the reaction mixture was chilled and the supernatant liquid poured off. The resin layer was heated until a resin which was brittle at room temperature was obtained. The resin was dissolved in a mixture of butyl alcohol and dioxane in the ratio of 1 part resin, 1 part n-butyl alcohol, and 2 parts dioxane.

A film of this resin varnish baked to a hard, transparent, tack-free, water-resistant state but had poor adhesion qualities.

A linseed oil acid-alkyd varnish comprising a 1:1 dioxane solution of the resinous reaction product obtained by heating 117 parts diethylene glycol, 99 parts maleic anhydride, and 56.4 parts linseed oil acids at 190–200° C. for 5½ hours was modified by the addition of this phenyl guanazole resin solution in such proportions that the final composition contained 1:1 mixtures of the two resin bases. Films of the resultant varnish which were baked at 110° C. for 14 hours were hard, tack-free, water-resistant, mar-proof, smooth, slightly yellowish in color, and adhered closely to the glass surface.

Comparable results were obtained when a tung oil acid-alkyd varnish consisting of 50 per cent dioxane solution of the resinous reaction product of 117 parts diethylene glycol, 150 parts phthalic anhydride, and 56.4 parts tung oil acids was modified by the addition thereto of the subject guanazole resin solution in such proportions that the final varnish contained 1:1 mixtures of the resin bases. Such dihydric alcohol-phthalic anhydride resins are not in themselves heat-hardenable even when baked for long periods of time. However, when modified with guanazole-formaldehyde resin, hard films were obtained after 14 hours baking at 110° C.

*Example 6*

A guanazole resin was prepared by heat-reacting a mixture of

| | Parts by weight |
|---|---|
| 1-(para-tolyl) guanazole | 96 |
| Aqueous formaldehyde (37.1% CH$_2$O) | 81 |
| Sodium hydroxide solution (0.5N) | 2 |
| Aqueous ammonia (28% conc.) | 3 |
| Chloroacetamide | 1.2 | at 60–80° C. in an open beaker on the hot plate. When two layers formed, the reaction mixture was chilled and the supernatant liquid poured off. The resin layer was further heated until a hard, tack-free mass formed on cooling to room temperature. A film of this resin on a glass slide baked at 110° C. for 20 hours lacked adhesion to the underlying glass surface. A solution of this resin was made from 1 part resin, 1 part n-butyl alcohol, and 2 parts dioxane and portions thereof were added to the alkyd resin varnishes of Example 5 in such proportions as to obtain modified varnishes containing equal parts by weight of the respective resin bases. Films of the resulting varnishes were baked at 110° C. for 14 hours and were found to be tack-free, even while hot, very hard, scratch-resistant, water-resistant, smooth, and strongly adherent to the glass surface.

From the above it will be noted that the 1-substituted guanazole resins impart certain advantageous properties to the oil-modified alkyd resins. In addition to accelerating the drying of the alkyd resin, they also improve the mar- or scratch-resistance of the final baked film. The alkyd resins, on the other hand, in general, improve the adherence and flexibility of the unmodified guanazole resin films.

Although in the above examples we have dissolved the resinified guanazole resins in butyl alcohol, we may alternatively use any suitable solvent or we may include an alcohol in the reaction mixture before resinification, thereby reacting the alcohol with the other ingredients. However, this is not preferred since the films so produced are darker in color.

As has been previously indicated, the tolyl-, naphthyl-, and other substituted 1-phenyl-guanazole resins are the preferred modifiers for alkyd resin compositions because of their increased solubility in ordinary solvents. The differences in relative solubility are particularly pronounced in guanazole resins which have been condensed to an advanced stage of resinification. Suitable solvents in general include ethylene glycol, cellosolve, benzyl alcohol, ethyl alcohol, butyl alcohol, dioxane, ethyl acetoacetate, chloroform, and mixtures of such solvents. Phenyl guanazole resins in the more advanced, but still fusible, stages of resinification lose the property of being soluble in all of these solvents excepting ethylene glycol, cellosolve, and benzyl alcohol. The naphthyl guanazole resins are in general more soluble in any given solvent than are the tolyl guanazole resins.

It will be understood, of course, by those skilled in the art that our invention is not limited to the specific alkyd resins or varnishes specifically mentioned in the foregoing examples. The specific resins, and the specific fatty oils, oil acids, polyhydric alcohols, and polybasic acids used in the preparation of those resins, are merely representative of a large number of alkyd resins and alkyd resin-forming reactants which may be used in the practice of our invention. Other alkyd varnishes which can be advantageously modified by the addition of the designated guanazole resins are those prepared from fatty oils or oil acids such as oiticica oil, perilla oil, sunflower oil, corn oil, etc. and their acids; polyhydric alcohols such as pentaerythritol, propylene glycol or the like; and polycarboxylic acids such as succinic acid, fumaric acid, citraconic acid, itaconic acid, etc., the reaction products of which are soluble in the usual varnish solvents.

In producing the 1-substituted guanazole resins, we prefer to use formaldehyde or compounds such as paraformaldehyde or hexamethylene tetramine, etc., capable of engendering formaldehyde. Other aldehydes which may be used are furfural, acetaldehyde, acrolein, methacrolein, propionaldehyde, benzaldehyde, etc., or mixtures thereof or mixtures thereof with formaldehyde or formaldehyde-engendering compounds.

Likewise, mixtures of two or more 1-hydrocarbon-substituted guanazoles, preferably containing some 1-aryl-substituted guanazoles may be used. The ratio of the aldehyde reactant or reactants to the guanazole or guanazole mixture may be considerably varied but, in general, it is desirable to use at least one mol of aldehyde for each mol of guanazole derivative. Good results usually are obtained by using from 1½ to 3¼ mols of aldehyde, specifically formaldehyde, for each mol of the guanazole. If both of the amino groups are unsubstituted, one advantageously may use two mols aldehyde, or slightly in excess of two mols aldehyde, for each mol of guanazole derivative. If the amidogen groups are each partly substituted, no particular advantage ordinarily accrues from using much in excess of one mol aldehyde for each mol of the guanazole reactant.

Although, as shown in the examples, we prefer to use equal parts guanazole-aldehyde resin and alkyd resin in preparing our improved coating compositions, it is to be understood that the invention is not limited to these proportions. Beneficial results may be obtained when the guanazole resin comprises as little as 30 per cent of the combined guanazole resin-alkyd resin base content of the final coating composition. The maximum amount of guanazole resin which should be employed depends largely upon economic considerations and upon the properties desired in the finished product. In general, the proportion of guanazole resin normally will not exceed 60 per cent of the resin content of the varnish.

What we claim as new and desire to secure by Letters Patent of the United States is:

1. A coating composition comprising a solution in an organic solvent of (1) a soluble fatty oil-modified alkyd resin and (2) a fusible, soluble resin obtained by heat reacting, under alkaline conditions, a 1-aryl substituted guanazole with an aldehyde in the absence of an alcohol and in the mol ratio of from one to about 3¼ mols aldehyde per mol guanazole until the resinous reaction product is solid at room temperature, the said guanazole resin comprising from 30 to 60 per cent of the combined guanazole resin-alkyd resin base content of said coating composition.

2. A coating composition comprising a solution in an organic solvent of (1) a soluble fatty oil-modified alkyd resin and (2) a fusible, soluble resin obtained by heat reacting, under alkaline conditions, a 1-aryl substituted guanazole with formaldehyde in the absence of an alcohol and in the mol ratio of from one to 3¼ mols formaldehyde per mol guanazole until the resinous reaction product is solid at room temperature, the said guanazole resin comprising from 30 to 60 per cent of the combined guanazole resin-alkyd resin base content of said coating composition.

3. A coating composition comprising a solution in an organic solvent of (1) a soluble fatty oil-modified alkyd resin and (2) a fusible, soluble resin obtained by heat reacting, under alkaline conditions, a 1-tolyl guanazole with formaldehyde in the absence of an alcohol and in the mol ratio of from one to 3¼ mols formaldehyde per mol guanazole until the resinous reaction product is solid at room temperature, the said guanazole resin comprising from 30 to 60 per cent of the combined guanazole resin-alkyd resin base content of said coating composition.

4. A coating composition comprising a solution in an organic solvent of (1) a soluble fatty oil-modified alkyd resin and (2) a fusible, soluble resin obtained by heat reacting, under alkaline conditions, a 1-tolyl guanazole with formaldehyde and a small amount of a curing agent in the absence of an alcohol and in the mol ratio of one mol 1-tolyl guanazole to from 1½ to 3¼ mols formaldehyde until the resinous reaction product is solid at room temperature, the said guanazole resin comprising about 50 per cent of the combined guanazole resin-alkyd resin base content of said coating composition.

5. A coating composition comprising a solution in an organic solvent of (1) a soluble fatty oil-modified alkyd resin and (2) a fusible, soluble resin obtained by heat reacting, under alkaline conditions, a 1-tolyl guanazole with formaldehyde in the absence of an alcohol and in the mol ratio of from one to 3¼ mols formaldehyde per mol guanazole until the resinous reaction product is solid at room temperature, the said guanazole resin comprising about 50 per cent of the combined guanazole resin-alkyd resin base content of said coating composition.

6. A coating composition comprising a solution in an organic solvent of (1) a soluble fatty oil-modified alkyd resin and (2) a fusible, soluble resin obtained by heat reacting, under alkaline conditions, a 1-naphthyl guanazole with formaldehyde in the absence of an alcohol and in the mol ratio of from one to 3¼ mols formaldehyde per mol guanazole until the resinous reaction product is solid at room temperature, the said guanazole resin comprising from 30 to 60 per cent of the combined guanazole resin-alkyd resin base content of said coating composition.

GAETANO F. D'ALELIO.
JAMES W. UNDERWOOD.